(12) United States Patent
Shalati et al.

(10) Patent No.: US 6,372,840 B1
(45) Date of Patent: Apr. 16, 2002

(54) DUAL STABILIZED DISPERSIONS OF GELLED POLYMERIC MICROPARTICLES AND COATINGS PRODUCED THEREFROM

(75) Inventors: Mohamad D. Shalati, Louisville, KY (US); Susana C. Steppan, Gibsonia; Michael A. Mayo, Pittsburgh, both of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 70 days.

(21) Appl. No.: 09/605,451

(22) Filed: Jun. 28, 2000

Related U.S. Application Data
(60) Provisional application No. 60/141,234, filed on Jun. 28, 1999.

(51) Int. Cl.[7] .......................... C08L 67/08; C08L 87/00; C08G 63/06; C08G 63/21; C08G 63/48

(52) U.S. Cl. .................. 524/504; 524/461; 524/513; 524/539; 524/566; 524/923; 525/7; 525/7.1; 525/69; 525/167.5

(58) Field of Search ................... 524/461, 513, 524/539, 566, 504, 923; 525/7, 7.1, 69, 167.5

(56) References Cited

U.S. PATENT DOCUMENTS

| | | | | |
|---|---|---|---|---|
| 3,691,123 A | * | 9/1972 | Clarke et al. | 260/29.1 R |
| 4,147,688 A | * | 4/1979 | Makhlouf et al. | 260/33.6 EP |
| 4,533,695 A | * | 8/1985 | Theodore et al. | 524/504 |
| 4,833,177 A | * | 5/1989 | Faler et al. | 523/221 |
| 5,025,060 A | | 6/1991 | Yabuta et al. | 524/533 |
| 5,468,801 A | | 11/1995 | Antonelli et al. | 524/504 |
| 5,516,820 A | | 5/1996 | Babjak et al. | 523/523 |

FOREIGN PATENT DOCUMENTS

| | | | | |
|---|---|---|---|---|
| GB | 1393166 | * | 5/1975 | C09D/3/00 |

* cited by examiner

*Primary Examiner*—David W. Wu
*Assistant Examiner*—Kelechi C. Egwim
(74) *Attorney, Agent, or Firm*—Deborah M. Altman; Dennis G. Millman

(57) ABSTRACT

In a dispersion containing acrylic polymer microparticles, particularly useful in automotive coatings, the dispersion is formed by free radical addition copolymerization of unsaturated monomers in a hydrocarbon dispersing medium in the presence of first and second polymeric dispersion stabilizers. The first polymeric dispersion stabilizer has an acrylic backbone and polyester side chains, and the second polymeric dispersion stabilizer is a branched polyester formed from the reaction of polyol, polyacid or anhydride, and fatty acid.

8 Claims, No Drawings

DUAL STABILIZED DISPERSIONS OF GELLED POLYMERIC MICROPARTICLES AND COATINGS PRODUCED THEREFROM

RELATED APPLICATION

This application claims benefit of the filing date of U.S. Provisional application Ser. No. 60/141,234 filed Jun. 28, 1999.

BACKGROUND OF THE INVENTION

Dispersed polymeric microparticles produced by non-aqueous dispersion techniques are well known. The polymer within the microparticles may be crosslinked, in which case they are sometimes referred to as microgel, and these crosslinked microparticles find use as rheology control agents in coating compositions, particularly for automobile coatings. The presence of the crosslinked microparticles reduces the tendency of wet coatings to sag prior to cure and, when the coating includes metallic pigments, has a beneficial effect on the alignment of the pigment. Both of these effects have the end result of producing a finish that is more attractive and is substantially free of defects.

Methods for preparing crosslinked polymeric microparticles are known in the art, an example of which is disclosed in U.S. Pat. No. 4,147,688 (Makhlouf et al.). Conventionally, the microparticles are prepared by free radical addition polymerization of monoethylenically unsaturated monomers in a hydrocarbon dispersion medium, in the presence of a steric stabilizer polymer. The steric stabilizer is typically characterized by a polymer in which one portion affiliates itself with the monomers and their polymerization product and another portion affiliates itself with the hydrocarbon dispersion medium. Since the hydrocarbon dispersion medium is often a non-polar, liquid aliphatic hydrocarbon, steric stabilizers often include a segment or side chains that are solvated by such non-polar liquids. Thus, in the aforesaid U.S. Pat. No. 4,147,688, the preferred steric stabilizer comprises a comb-type polymer having an acrylic backbone with polyester side chains. These polyester side chains are poly(12-hydroxystearic acid) reacted with glycidyl methacrylate, for example, to provide unsaturation for copolymerization into the acrylic backbone.

In order to provide greater versatility to non-aqueous dispersions, the prior art has suggested using combinations of different steric stabilizers. For example, U.S. Pat. No. 5,025,060 (Yabuta et al.) discloses a stabilizer based on poly(12-hydroxystearic acid) used in combination with another stabilizer which is an acrylic polymer with unsaturated side chains or terminal groups. In another example, U.S. Pat. No. 5,468,801 (Antonelli et al.) also discloses a stabilizer based on poly(12-hydroxystearic acid) used in combination with a second stabilizer which is an acrylic macromolecule grafted onto the microparticle core polymer by means of terminal unsaturation.

A non-aqueous dispersion using an alkyd type of steric stabilizer is disclosed in U.S. Pat. No. 5,516,820 (Babjak et al.). The alkyd is made from a vegetable oil, pentaerythritol, maleic anhydride, and phthalic anhydride, and would be expected to have a branched polyester structure.

In some coating formulations in which microparticles are used for rheology control, conditions are encountered that are more polar than is optimum for the functioning of conventional steric stabilizers. When these conditions are encountered, dispersions relying on conventional steric stabilizers such as those based on poly(12-hydroxystearic acid) can become de-stabilized. In that case, microparticles that come out of dispersion create the visible coating defect known as "seeds." It would be desirable to provide enhanced stabilization of microparticles in these situations.

It has also been found that the effectiveness of stabilizers based on poly(12-hydroxystearic acid) sometimes varies. It has been discovered that this problem is attributable to variations in the poly(12-hydroxystearic acid) itself as received from the supplier.

SUMMARY OF THE INVENTION

The present invention provides dual stabilization to microparticle dispersions, that is, a combination of two different steric stabilizers is used. One stabilizer may be the conventional acrylic comb type with side chains that are solvatable in the hydrocarbon dispersing medium. These side chains may comprise the commonly used poly(12-hydroxystearic acid). The other stabilizer is a hyper-branched polyester having hydrophobic side chains and a polar backbone. This combination has been found useful for enhancing microparticle stability in coating formulations having relatively polar constituents. As a result, coating formulations may include these polar constituents as dictated by other performance requirements without increasing the incidence of seeding caused by microparticle destabilization. Additionally, it has been discovered that the combination of stabilizers of the present invention masks the variations that occur in poly(12-hydroxystearic acid) from suppliers.

DETAILED DESCRIPTION

The basic process of forming gelled microparticles in the present invention may be essentially the same as that described in U.S. Pat. No. 4,147,688, a process which comprises the free radical addition copolymerization of alpha, beta-ethylenically unsaturated monocarboxylic acid, at least one other copolymerizable monoethylenically unsaturated monomer and a crosslinking monomer selected from the group consisting of (1) epoxy group-containing compound and (2) a mixture of alkylenimine and organoalkoxysilane. This free radical polymerization takes place in the presence of the polymeric steric stabilizers and the hydrocarbon dispersing liquid. The dispersing liquid is selected to be a solvent to the monomers but not to the cross-linked acrylic polymer particles. The reaction is carried out at elevated temperatures such that the dispersion polymer first forms and then is crosslinked; usually at temperatures between about 50° C. and 150° C.

Examples of alpha, beta-ethylenically unsaturated monocarboxylic acid which may be used are acrylic acid, methacrylic acid, ethacrylic acid, alpha-chloroacrylic acid, crotonic acid isocrotonic acid, tiglic acid and angelic acid. The preferred alpha, beta-ethylenically unsaturated monocarboxylic acids are acrylic acid and methacrylic acid. Methacrylic acid is especially preferred. The amount of alpha, beta-ethylenically unsaturated monocarboxylic acid employed in the process of the invention is usually in the range of from about 0.5 percent to about 15 percent by weight of the monomers used in the copolymerization process.

Various other monoethylenically unsaturated monomers may be copolymerized with the acid monomer in the process of this invention. Although essentially any copolymerizable monoethylenic monomer may be utilized, depending upon the properties desired, the preferred monoethylenically-unsaturated monomers are the alkyl esters of acrylic or methacrylic acid, particularly those having from about 1 to about 4 atoms in the alkyl group. Illustrative of such compounds are the alkyl acrylates, such as methyl acrylate, ethyl acrylate, propyl acrylate, and butyl acrylate and the alkyl methacrylates, such as methyl methacrylate, ethyl methacrylate, propyl methacrylate and butyl methacrylate. Other ethylenically unsaturated monomers which may advantageously be employed include, for example, the vinyl aromatic hydrocarbons, such as styrene, alpha-methyl styrene, vinyl toluene, unsaturated esters of organic and inorganic acids, such as vinyl acetate, vinyl chloride and the like, and the unsaturated nitriles, such as acrylonitrile, methacrylonitrile, ethacrylonitrile, and the like. From about 70 percent to about 99 percent by weight of such monoethylenically unsaturated monomers, based on the weight of monomer solids can be utilized.

Crosslinking can be provided in the microparticle polymer by including a crosslinking monomer selected from the group consisting of (1) epoxy group-containing compounds and (2) mixtures of alkylenimine and organoalkoxysilane. A particularly preferred class of epoxy group-containing compounds that may be utilized for crosslinking are monoepoxide compounds that additionally contain ethylenic unsaturation. Illustrative of such compounds are, for example, glycidyl acrylate and glycidyl methacrylate.

For disclosure regarding the various alkylenimines and organoalkoxysilanes that can be utilized as crosslinkers, reference may be had to the Maklouf et al. patent (U.S. Pat. No. 4,147,688).

The proportion of the crosslinking monomers employed in the monomer mixture used for copolymerization of the microparticles may range from 0.5 percent to 15 percent by weight of the monomers used in the copolymerization process. When the crosslinking functionality is provided by a mixture of alkylenimine and organoalkoxysilane, the mole ratio of the alkylenimine to the alpha, beta-ethylenically unsaturated monocarboxylic acid used to prepare the polymer is generally in the range of from 0.5:1 to 1.5:1 and the mole ratio of the organoalkoxysilane to the alpha, beta-ethylenically unsaturated monocarboxylic acid used to prepare the polymer is generally in the range of from 1.5:1 to 3.5:1.

The monoethylenically-unsaturated monomer, acid monomer and crosslinking monomer are polymerized in a dispersing liquid that solubilizes the monomers but in which the resulting polymers are essentially not soluble but form dispersed polymer particles. The dispersing liquid is generally a hydrocarbon medium consisting essentially of liquid aliphatic hydrocarbons. A pure aliphatic hydrocarbon or a mixture of two or more may be employed. To the extent that any particular polymer produced is mostly insoluble in a hydrocarbon mixture, the essentially aliphatic hydrocarbon may be modified by incorporation of other solvent materials such as aromatic or naphthenic hydrocarbons, and in certain instances, the amount of such non-aliphatic component may be as high as 49 percent by weight of the entire dispersing liquid. However, the dispersing liquid preferably consists essentially of aliphatic hydrocarbons and, in general, the compositions of the present invention contain less than 25 percent by weight based on the weight of the dispersing liquid of an aromatic hydrocarbon and often none at all at this stage.

The dispersing hydrocarbon is liquid in character, but it may have a wide range of boiling temperatures, from a minimum of about 30° C. (in which case high pressures may be needed in the polymerization) to a maximum which may be as high as 300° C. For most purposes, the boiling point should be from about 50° C. up to about 235° C. Examples of dispersing liquids useful herein are pentane, hexane, heptane, octane, mixtures of the same, and the like.

Ordinarily, the polymerizable composition of monomers and dispersing liquid may contain from about 30 to about 80 percent by weight of the dispersing liquid. However, the monomeric solution need contain only that amount of dispersing liquid necessary to solubilize the monomers and maintain the resulting polymers in a dispersed state after polymerization.

The monomers from which the microparticle core is produced are polymerized in the presence of the novel steric stabilizer combination of the present invention. The steric stabilizer combination includes at least two different polymeric stabilizers, one of which is the type described in U.S. Pat. No. 4,147,688. The stabilizer of that patent is a comb polymer comprising an acrylic backbone having side chains that are relatively non-polar and therefore relatively soluble in the hydrocarbon dispersing medium, whereas the backbone itself is relatively insoluble in the medium but has an affinity for the microparticles. The side chains may be copolymerized into the backbone as mono-unsaturated macromonomers having molecular weight of about 300 to about 3,000. These macromonomers may be made, for example, by condensation reactions producing a polyester or polyether. The most convenient monomers to use are hydroxy acids or lactones that form hydroxy acid polymers. For example, a hydroxy fatty acid such as 12-hydroxystearic acid may be polymerized to form a linear polyester. Unreacted terminal functionality of the poly(hydroxy stearic acid) may then be reacted with a compound, such as glycidyl acrylate or glycidyl methacrylate, to provide unsaturation to the polyester. Alternatively, polyester macromonomers may be made conventionally by reacting diacids with diols. For example, 1, 12-dodecanediol may be reacted with sebacic acid or its diacid chloride to form a component solvatable by aliphatic hydrocarbons.

The acrylic backbone of the first steric stabilizer (i.e., the type disclosed in U.S. Pat. No. 4,147,688) is relatively non-solvated by the dispersing liquid and is capable of anchoring onto the acrylic polymeric particles formed by the polymerization. It may contain a pendant group which is copolymerizable with the acrylic monomer. This backbone provides a layer of the stabilizer around the polymerized microparticles. The backbone may comprise copolymers of acrylic or methacrylic esters, such as methyl acrylate, methyl methacrylate, ethyl acrylate, ethyl methacrylate, butyl acrylate, butyl methacrylate, 2-ethylhexyl acrylate, octyl methacrylate, and the like. To provide pendant groups, the backbone may additionally include copolymerizable monomers that contain reactive functionality (such as glycidyl acrylate and glycidyl methacrylate) by which ethylenically-unsaturated groups may be grafted onto the backbone (such as acrylic acid, methacrylic acid, 3-butenoic acid, crotonic acid, and itaconic acid). The preferred backbone is a terpolymer of methyl methacrylate, glycidyl methacrylate, and methacrylic acid.

The second steric stabilizer is a hyperbranched polyester having hydrophobic side chains and a polar backbone. The polyester is made by condensation polymerization of polyol, diacid (or anhydride), and saturated fatty mono-acid. Preferred polyols are those with relatively small molecular weight such as butanediol, trimethylol propane, and pentaerythritol. Polyols having greater than two hydroxyl groups per molecule are preferred, such as trimethylol propane and pentaerythritol, and mixtures of both of these have been found particularly useful. The diacid may primarily comprise one or more saturated diacid, but optionally may include unsaturated diacid (or anhydride) in order to provide for grafting sites. Any diacid suitable for polyester condensation may be used. Particularly useful is hexahydrophthalic anhydride. Most conveniently, unsaturated diacid may be maleic anhydride. The fatty mono-acid may comprise any long-chain mono-acid, examples of which are lauric acid, butyric acid, isovaleric acid, and octanoic acid. A particularly useful fatty acid is isostearic acid. On a mole percentage basis, the monomer proportions for making the hyperbranched polyester comprise 10–30 percent polyol, 10–30 percent saturated diacid, 0–5 percent unsaturated diacid, and 50–75 percent fatty mono-acid. A specific, preferred embodiment contained, on a mole basis, 9 percent trimethylol propane, 12 percent pentaerythritol, 21 percent hexahydrophthalic anhydride, 0.5 percent maleic anhydride, and isostearic acid as the remainder.

The total amount of steric stabilizers used to make the microparticles is in the range of from about 10 to about 40 percent by weight based on the total weight of monomers and steric stabilizer solids. The two stabilizers may be used in approximately equal weight proportions, but preferably the hyperbranched polyester is used in larger amounts than the comb polymer, up to about four times greater by weight.

The polymerization of the microparticles may be carried out in a conventional manner, utilizing heat and/or catalysts and varying solvents and techniques. Generally, a free radical catalyst such as cumene hydroperoxide, benzoyl peroxide or similar peroxygen compound, or an azo compound such as azobis(isobutyronitrile) is employed. The resultant non-aqueous acrylic dispersion consists essentially of microgel particles (i.e., crosslinked acrylic polymer particles) dispersed therein. These particles have diameters typically ranging from 0.1 to 10 microns.

The following examples are submitted for the purpose of further illustrating the nature of the present invention and should not be interpreted as a limitation on the scope thereof. All parts and percentages in the examples as well as throughout the specification are by weight unless otherwise indicated.

EXAMPLE A

| Preparation of First Stabilizer | |
|---|---|
| Component | Parts by Weight |
| *Initial Charge* | |
| Butyl Acetate | 311.0 |
| *Charge A* | |
| VAZO-64 initiator | 13.7 |
| Methyl methacrylate | 281.0 |
| UNOCAL Blend 2324 hydrocarbon solvent | 232.5 |
| Glycidyl methacrylate | 26.4 |
| Poly(12-hydroxy stearic acid)[1] | 367.6 |
| *Charge B* | |
| Butyl acetate | 8.8 |
| *Charge C* | |
| T-Butyl catechol (100% Solids) | 0.076 |
| ARMEEN DMCD (coco dimethyl amine) | 0.75 |
| *Charge D* | |
| Methacrylic acid | 5.5 |

| Preparation of First Stabilizer (continued) | |
|---|---|
| Component | Parts by Weight |
| *Charge E* | |
| Butyl acetate | 259.1 |

[1]The poly(12-hydroxystearic acid) polyester in Charge A was previously prepared in a reaction vessel under nitrogen by providing an initial charge of 100 parts by weight 12-hydroxystearic acid and 443 parts by weight toluene, which were heated to 80° C. To the initial charge was added 2468.8 parts by weight of additional 12-hydroxystearic acid and 5.14 parts by weight methane sulfonic acid. This was held at reflux while removing water by means of a Dean-Stark trap until acid value reached about 29 to 31. With the reaction mixture at 145 to 150° C., the following feeds were added: a mixture of 118.5 parts by weight hydrocarbon solvent blend, 3.07 parts by weight t-butyl catechol, and 17.8 parts by weight toluene, and then 309.9 parts by weight glycidyl methacrylate, followed by 10.3 parts by weight ARMEEN DMCD fatty amine from Akzo Nobel. The product had an acid value of 0.13, total solids of 81.80 at 110° C. for 1 hour, weight average molecular weight of 6633, number average molecular weight of 5033, and peak molecular weight of 9037 as determined by gel permeation chromatography, polystyrene standard.

The initial charge was heated to 98–100° C. in a suitable reaction vessel, into which Charge A was introduced over a period of 3 hours. Charge B was then added and the mixture was held for 2 hours. Charge C and then Charge D were added, after which the mixture was held until the acid value dropped below 1. Charge E was then added. The product was 42 weight percent solids.

EXAMPLE B

| Preparation of Second Stabilizer | |
|---|---|
| Component | Parts by Weight |
| *Charge A* | |
| Isostearic acid | 1105 |
| Trimethylol propane | 173 |
| Pentaerythritol | 237.5 |
| Maleic anhydride | 8.2 |
| Hexahydrophthalic anhydride | 414.5 |
| Xylene | 100 |
| *Charge B* | |
| Heptane | 455 |

The reaction took place in a 3-liter polymerization flask equipped with $N_2$ inlet, thermocouple, stirrer, condenser, heating mantel, and Dean-Stark trap. Charge A was introduced into the reaction flask and heated gradually. The temperature was gradually increased to 220° C. Heating and removal of water continued until an acid value of about 11–12 was obtained. The reaction product was then cooled to 100° C. and reduced to 80% solids with heptane (Charge B). The product was 79.65 weight percent solids.

EXAMPLE 1

Preparation of Microgel

| Component | Parts by Weight |
|---|---|
| Charge A | |
| Heptane | 565.2 |
| Isoparaffin hydrocarbon | 81 |
| Stabilizer of Example B | 495 |
| Charge B | |
| Methyl methacrylate | 48.6 |
| VAZO ® 67 azonitrile initiator (DuPont) | 4.2 |
| Stabilizer of Example A | 95.4 |
| Isoparaffin hydrocarbon | 176.4 |
| Charge C | |
| Heptane | 37.8 |
| Charge D | |
| Methyl methacrylate | 1275.3 |
| Stabilizer of Example A | 243 |
| Stabilizer of Example B | 0 |
| Glycidyl methacrylate | 69.66 |
| Methacrylic acid | 52.47 |
| Dimethyl cocoamine | 4.05 |
| N-Octyl mercaptan | 14.4 |
| Heptane | 603.9 |
| Isoparaffin Hydrocarbon | 259.2 |
| VAZO-67 | 5.62 |
| Charge E | |
| Heptane | 27 |
| Isoparaffin hydrocarbon | 13.5 |

The reaction took place in a 5 liter polymerization flask equipped with a stirrer, $N_2$ blanket, condenser, FM1 pump, and thermocouple. After introducing Charge A to the flask, it was heated to reflux (94–100° C.). Prepare Charges B & C in advance. Charge B was pre-mixed and added to the flask over 5 minutes and rinsed with Charge C. The reactants were then agitated and held for 15 minutes at reflux. Charge D was then added over 3 hours at a constant rate of 15.55 grams per minute using the reflux line. When the addition of D was concluded, the vessel was rinsed with Charge E. After a one hour hold, the product was cool and filtered using a 10 micron filter bag.

In Tables I and II alternative compositions are set forth for the hyperbranched polyester stabilizer of the present invention. The components were reacted in the same manner as set forth in Example B.

TABLE I (Parts by Weight)

| Example: | C | D | E | F | G |
|---|---|---|---|---|---|
| Isostearic acid | 0 | 57.0 | 57.2 | 57.8 | 50.0 |
| Lauric acid | 48.3 | 0 | 0 | 0 | 0 |
| Butyric acid | 0 | 0 | 0 | 0 | 3.6 |
| Trimethylol propane | 10.7 | 8.9 | 9.0 | 9.0 | 9.6 |
| Pentaerythritol | 14.7 | 12.3 | 12.3 | 12.4 | 13.2 |
| Maleic anhydride | 0.51 | 0.42 | 0.98 | 2.82 | 0.46 |
| Hexahydrophthalic Anhydride | 25.7 | 21.4 | 20.6 | 17.9 | 23.1 |

TABLE II (Parts by Weight)

| Example: | H | I | J | K |
|---|---|---|---|---|
| Isostearic acid | 56.9 | 44.9 | 46.9 | 0 |
| Isovaleric acid | 0 | 6.8 | 0 | 0 |
| Octanoic acid | 0 | 0 | 0 | 40.1 |
| Trimethylol propane | 8.9 | 10.0 | 9.9 | 12.4 |
| Pentaerythritol | 12.2 | 13.8 | 10.2 | 17.1 |
| Butanediol | 0 | 0 | 4.5 | 0 |
| Maleic anhydride | 0 | 0.47 | 0.47 | 0.59 |
| Hexahydrophthalic anhydride | 22.0 | 24.0 | 28.1 | 29.8 |

What is claimed is:

1. A dispersion containing acrylic polymer microparticles, the dispersion being formed by free radical addition copolymerization of unsaturated monomers in hydrocarbon dispersing liquid in the presence of first and second polymeric dispersion stabilizers, the first polymeric dispersion stabilizer having an acrylic backbone and polyester side chains, and the second polymeric dispersion stabilizer being a branched polyester formed from the reaction of polyol, polyacid or anhydride, and fatty acid.

2. The dispersion of claim 1 wherein the polyester side chains of the first dispersion stabilizer comprise groups derived from poly(hydroxystearic acid).

3. The dispersion of claim 1 wherein the polyol component of the second polymeric dispersion stabilizer has an average of greater than 2.0 hydroxyl groups per molecule.

4. The dispersion of claim 1 wherein the polyol component of the second polymeric dispersion stabilizer has an average of greater than 3.0 hydroxyl groups per molecule.

5. The dispersion of claim 4 wherein the polyol component of the second polymeric dispersion stabilizer comprises trimethylol propane and pentaerythritol.

6. The dispersion of claim 3 wherein the fatty acid component of the second polymeric dispersion stabilizer fatty acid comprises isostearic acid.

7. The dispersion of claim 6 wherein the diacid or anhyride component of the second polymeric dispersion stabilizer comprises hexahydrophthalic anhydrid.

8. The dispersion of claim 1 wherein the second polymeric dispersion stabilizer is present in larger amounts by weight than the first polymeric dispersion stabilizer.

\* \* \* \* \*